United States Patent
Takeuchi

(10) Patent No.: US 8,367,997 B2
(45) Date of Patent: Feb. 5, 2013

(54) IMAGE READING DEVICE, COMPUTER READABLE MEDIUM, AND LIGHT AMOUNT ADJUSTING METHOD

(75) Inventor: Hideo Takeuchi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 798 days.

(21) Appl. No.: 12/420,852

(22) Filed: Apr. 9, 2009

(65) Prior Publication Data

US 2010/0051782 A1 Mar. 4, 2010

(30) Foreign Application Priority Data

Aug. 26, 2008 (JP) ................................. 2008-217260

(51) Int. Cl.
*H01L 27/00* (2006.01)
*G01J 1/20* (2006.01)

(52) U.S. Cl. ....................... 250/208.1; 250/205; 358/482

(58) Field of Classification Search ................ 250/208.1, 250/552, 553, 204, 205, 214 AG, 214 AL, 250/214 B, 214 C, 234; 358/512, 513, 482, 358/483

See application file for complete search history.

(56) References Cited

U.S. PATENT DOCUMENTS

| | | | | |
|---|---|---|---|---|
| 5,099,260 A | * | 3/1992 | Sato et al. ...................... | 347/116 |
| 5,099,341 A | * | 3/1992 | Nosaki et al. .................. | 358/461 |
| 5,111,309 A | * | 5/1992 | Sakata .......................... | 358/3.22 |
| 5,162,644 A | * | 11/1992 | Nagata et al. ............... | 250/208.1 |
| 5,514,864 A | * | 5/1996 | Mu-Tung et al. ............. | 250/205 |
| 5,726,437 A | * | 3/1998 | Ashikaga et al. ............. | 250/205 |
| 5,902,993 A | * | 5/1999 | Okushiba et al. ........... | 250/208.1 |
| 6,207,946 B1 | * | 3/2001 | Jusoh et al. ................. | 250/208.1 |
| 6,423,964 B2 | * | 7/2002 | Nakaya et al. ................ | 250/234 |
| 6,785,026 B1 | * | 8/2004 | Terajima et al. .............. | 358/509 |
| 7,202,461 B2 | * | 4/2007 | Muraoka ..................... | 250/208.1 |
| 7,498,553 B2 | * | 3/2009 | Shimokawa .................. | 250/205 |
| 7,999,215 B2 | * | 8/2011 | Ebisawa et al. ............. | 250/208.1 |
| 2001/0007411 A1 | * | 7/2001 | Matsuura et al. ........... | 315/169.3 |
| 2003/0178550 A1 | * | 9/2003 | Yamamoto et al. ........ | 250/208.1 |
| 2005/0161582 A1 | * | 7/2005 | Lee et al. ...................... | 250/205 |
| 2006/0017944 A1 | * | 1/2006 | Nakahanada et al. ........ | 358/1.8 |
| 2007/0076274 A1 | * | 4/2007 | Higashitani .................. | 358/504 |
| 2008/0055668 A1 | * | 3/2008 | Hirayama ..................... | 358/461 |
| 2010/0051782 A1 | * | 3/2010 | Takeuchi ....................... | 250/205 |

FOREIGN PATENT DOCUMENTS

| JP | 61-49553 A1 | 3/1986 |
|---|---|---|
| JP | 6315085 A | 11/1994 |
| JP | 2005-51381 A1 | 2/2005 |

OTHER PUBLICATIONS

Japanese Office Action in counterpart application No. 2008-217260, dated May 8, 2012.

* cited by examiner

*Primary Examiner* — John Lee
(74) *Attorney, Agent, or Firm* — Sughrue Mion, PLLC

(57) ABSTRACT

An image reading device has: a light source at which plural light-emitting elements are arrayed; a detection unit that detects light amounts of illumination light which are emitted from the light-emitting elements and are reflected by a reference plate; a derivation unit; and an adjustment unit. On the basis of detected light amounts, the derivation unit derives difference amounts between a reference value and average values of light amounts per predetermined first number of adjacent light-emitting elements. On the basis of the derived difference amounts, the adjustment unit adjusts light amounts per the first number of light-emitting elements such that the average values become the reference value.

6 Claims, 11 Drawing Sheets

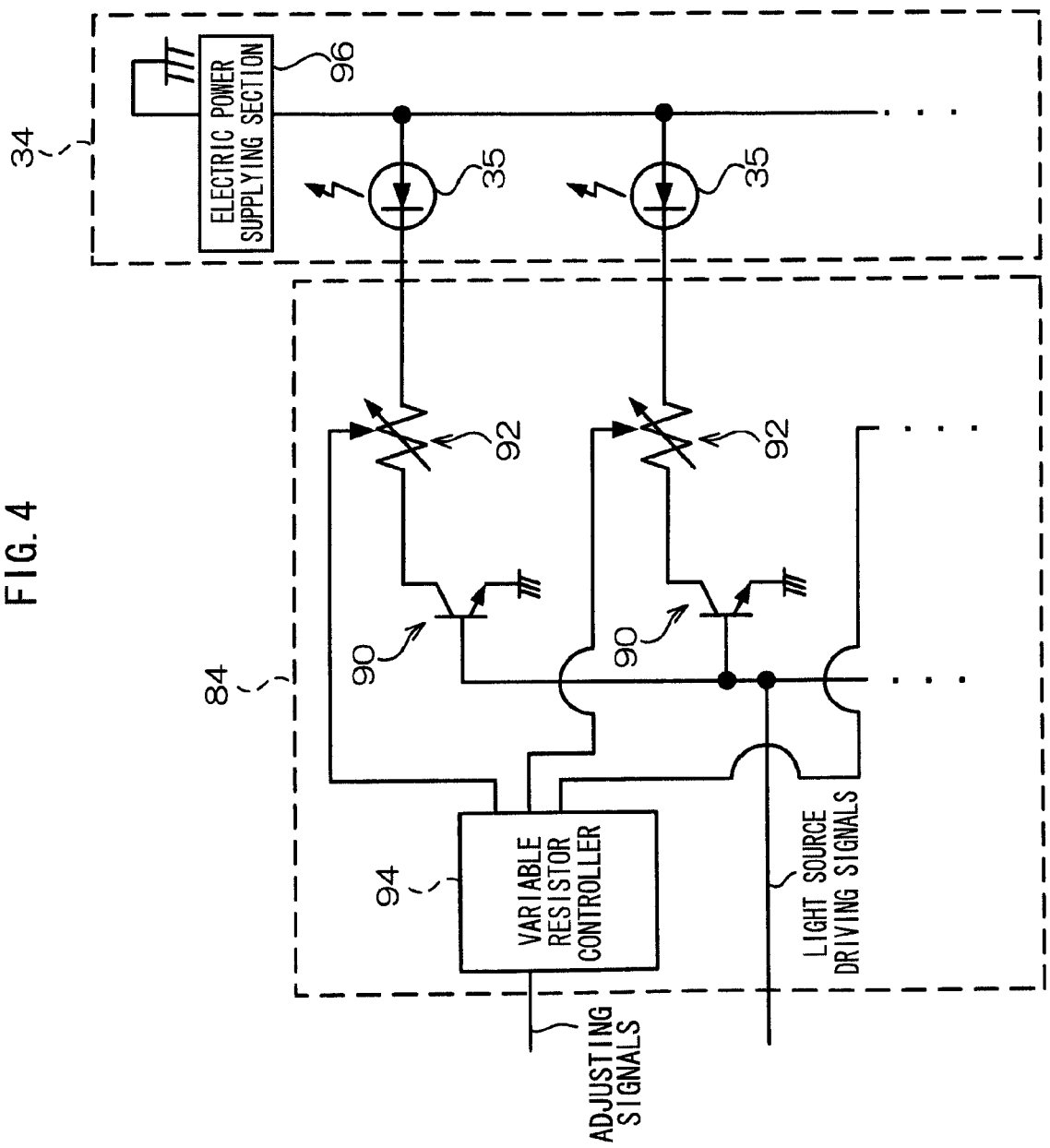

FIG. 6A

| DEVIATION AMOUNT | ADJUSTMENT AMOUNT |
|---|---|
| +20 | -2.0 |
| +15 | -1.5 |
| +10 | -1.0 |
| +5 | -0.5 |
| -5 | +0.5 |
| -10 | +1.0 |
| -15 | +1.5 |
| -20 | +2.0 |

FIG. 6B

| DEVIATION AMOUNT | ADJUSTMENT AMOUNT |
|---|---|
| +4 | -0.4 |
| +3 | -0.3 |
| +2 | -0.2 |
| +1 | -0.1 |
| -1 | +0.1 |
| -2 | +0.2 |
| -3 | +0.3 |
| -4 | +0.4 |

IMAGE READING DEVICE, COMPUTER READABLE MEDIUM, AND LIGHT AMOUNT ADJUSTING METHOD

CROSS-REFERENCE TO RELATED APPLICATION

This application claims priority under 35 USC 119 from Japanese Patent Application No. 2008-217260 filed Aug. 26, 2008.

BACKGROUND

1. Technical Field

The present invention relates to an image reading device, a computer readable medium that stores a program for light amount adjusting processing, and a light amount adjusting method.

2. Related Art

In an image reading device that carries out image reading by receiving, at plural light-receiving elements, reflected light from an image that is read, the following technique has been provided. Changes in the light amounts that are illuminated onto the image that is read are sensed. Image signals that are outputted from the plural light-receiving elements are amplified in accordance with the detected changed amounts of the light amounts, so that the levels of the image signals become substantially constant. Due thereto, stable image signals are outputted regardless of changes in the light amount of the light source.

SUMMARY

According to an aspect of the invention, there is provided an image reading device includes: a light source at which a plurality of light-emitting elements are arrayed along a predetermined direction, the plurality of light-emitting elements emitting illumination light; a detection unit that detects light amounts of illumination light, the illumination light being emitted from the plurality of light-emitting elements and reflected by a reference plate; a derivation unit that, on the basis of the light amounts detected by the detection unit, derives difference amounts between a reference value and average values of light amounts per predetermined first number of adjacent light-emitting elements; and an adjusting unit that, on the basis of the difference amounts derived by the derivation unit, adjusts light amounts per the first number of light-emitting elements such that the average values become the reference value.

BRIEF DESCRIPTION OF THE DRAWINGS

Exemplary embodiments of the present invention will be described in detail based on the following figures, wherein:

FIG. 4 is a circuit diagram showing the structure of a light source driving circuit relating to the exemplary embodiment;

FIG. 6A and FIG. 6B are schematic drawings showing examples of rough adjustment amount information and fine adjustment amount information relating to the exemplary embodiment;

DETAILED DESCRIPTION

First, the overall structure of an image reading device 10 relating to the present exemplary embodiment will be described with reference to FIG. 1.

Figure 1:
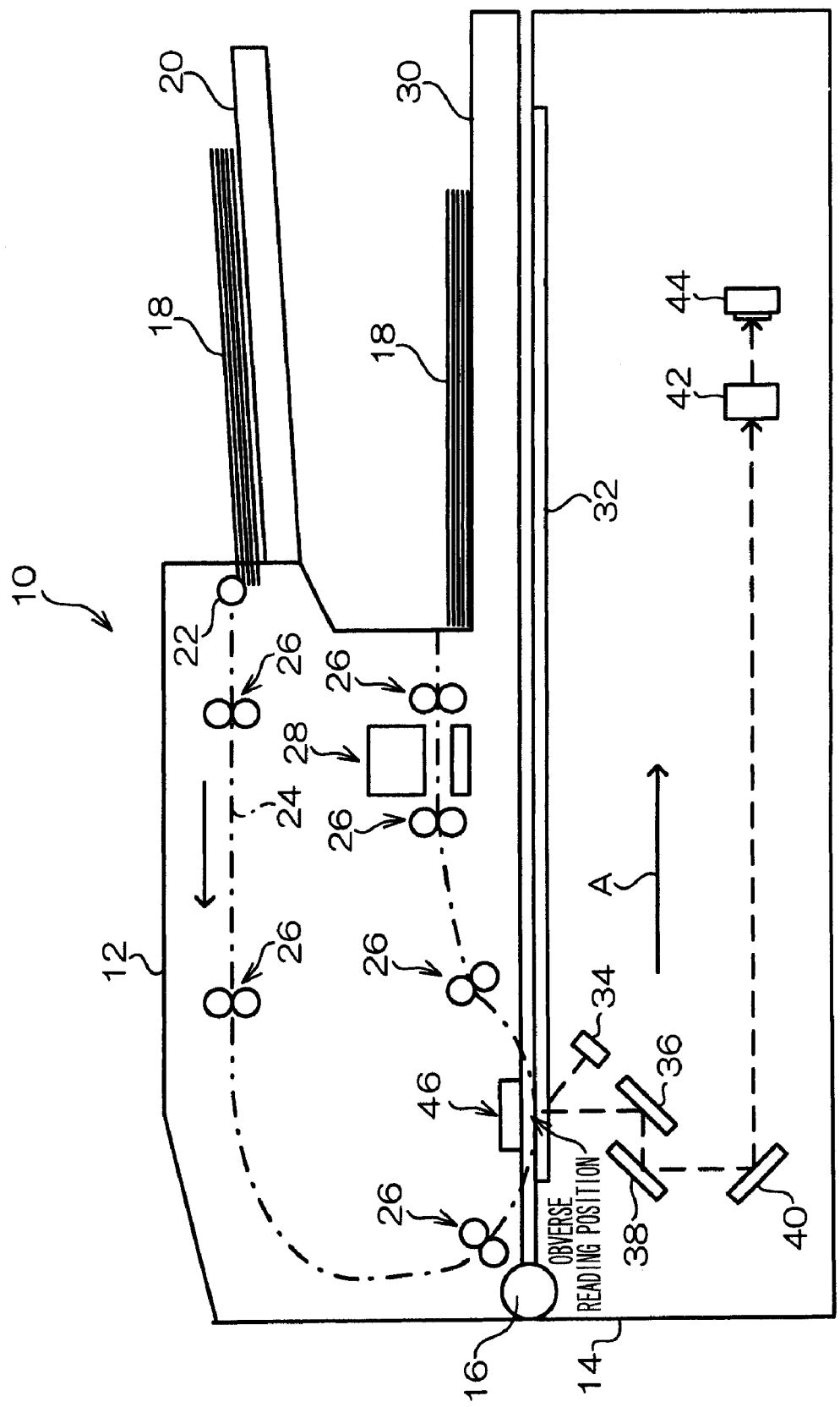
FIG. 1 is a broken side view showing the structure of an image reading device relating to an exemplary embodiment.

As shown in FIG. 1, the image reading device 10 has a document conveying section 12 and an image reading section 14. The document conveying section 12 and the image reading section 14 are connected by a connecting section 16. The document conveying section 12 can be opened and closed toward upwardly of the image reading section 14 around the connecting section 16.

The document conveying section 12 has a document stand 20 on which are placed documents 18 on which images are recorded. The documents 18 that are placed on the document stand 20 are taken-out one-by-one by a take-out roller 22, and are fed to a conveying path 24.

The document 18 that is fed to the conveying path 24 is conveyed by conveying roller pairs 26 to an obverse reading position of the image reading section 14. After the obverse is read at the image reading section 14, the document 18 is conveyed to a reverse image reading section 28 that is set at the conveying direction downstream side of the obverse reading position. After the reverse is read at the reverse image reading section 28, the document 18 is ejected to an ejected sheet section 30.

On the other hand, the image reading section 14 is provided with a transparent platen glass 32 on whose top surface the document 18 can be placed. The obverse reading position is positioned at the top surface of the platen glass 32.

Beneath the platen glass 32 at the obverse reading position, there are provided a light source 34 that emits illumination light toward the obverse of the document 18, a first reflecting mirror 36 that receives the reflected light that is reflected at the obverse of the document 18, a second reflecting mirror 38 for bending by 90° the advancing direction of the reflected light received at the first reflecting mirror 36, and a third reflecting mirror 40 for further bending by 90° the advancing direction of the reflected light received at the second reflecting mirror 38.

Figure 2:
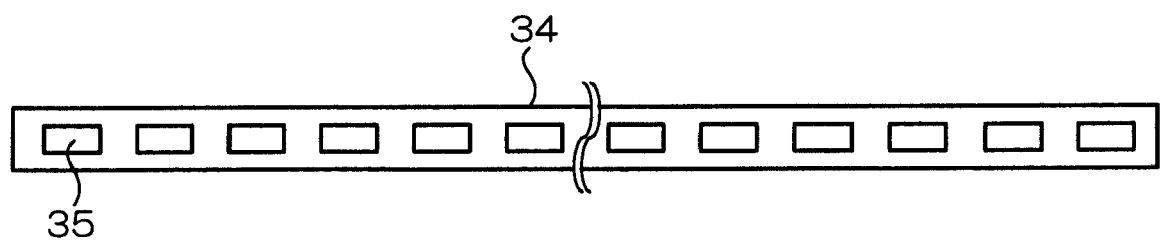
FIG. 2 is an external view showing the structure of a light source relating to the exemplary embodiment.

The structure of the light source 34 is shown in FIG. 2.

As shown in FIG. 2, at the light source 34, plural light-emitting elements 35 that respectively emit illumination light are arrayed along a predetermined direction (in the image reading device 10 relating to the present exemplary embodiment, a direction intersecting the conveying direction of the document 18). Note that, in the image reading device 10 relating to the present exemplary embodiment, LED (Light Emitting Diode) elements are used as the light-emitting elements 35. However, the present invention is not limited to the same, and other light-emitting elements such as organic EL (Electro Luminescence) elements, inorganic EL elements, or the like may be used. Further, the number of the light-emitting element 35 that are used in the image reading device 10 relating to the present exemplary embodiment is 36, but the number of light-emitting elements is not limited to this.

Referring back to FIG. 1, the image reading section 14 has a lens 42 that images the reflected light reflected at the third reflecting mirror 40, and a light detecting section 44 that detects the light amounts of the illumination light emitted from the respective light-emitting elements 35 and outputs image signals corresponding to the light amounts.

A CCD line sensor, that is structured by plural CCDs (Charge Coupled Devices), is used as the light detection unit 44 in the image reading device 10 relating to the present exemplary embodiment. However, the present invention is not limited to the same. A CMOS (Complementary Metal-Oxide Semiconductor) image sensor or the like may be used.

Note that, in the image reading device 10 relating to the present exemplary embodiment, the light source 34, the first reflecting mirror 36, the second reflecting mirror 38 and the third reflecting mirror 40 are fixed to an unillustrated carriage. By moving the carriage, the light source 34, the first reflecting mirror 36, the second reflecting mirror 38 and the third reflecting mirror 40 can move in the direction of arrow A in FIG. 1. The document conveying section 12 is opened toward upwardly of the image reading section 14, and the document 18 is placed on the top surface of the platen glass 32. The image that is recorded on the document 18 can be read by moving the light source 34, the first reflecting mirror 36, the second reflecting mirror 38 and the third reflecting mirror 40 in the direction of arrow A while emitting the illumination light from the light source 34 toward the document 18.

Further, the image reading device 10 relating to the present exemplary embodiment has a reference plate 46 at the obverse reading position at the document conveying section 12. When detecting the light amounts of the illumination light emitted by the respective light-emitting elements 35, the light detection unit 44 detects the light amounts of the illumination light emitted from the respective light-emitting elements 35 and are reflected by the reference plate 46.

The structure of main portions of the electrical system of the image reading device 10 relating to the present exemplary embodiment will be described next with reference to FIG. 3.

Figure 3:
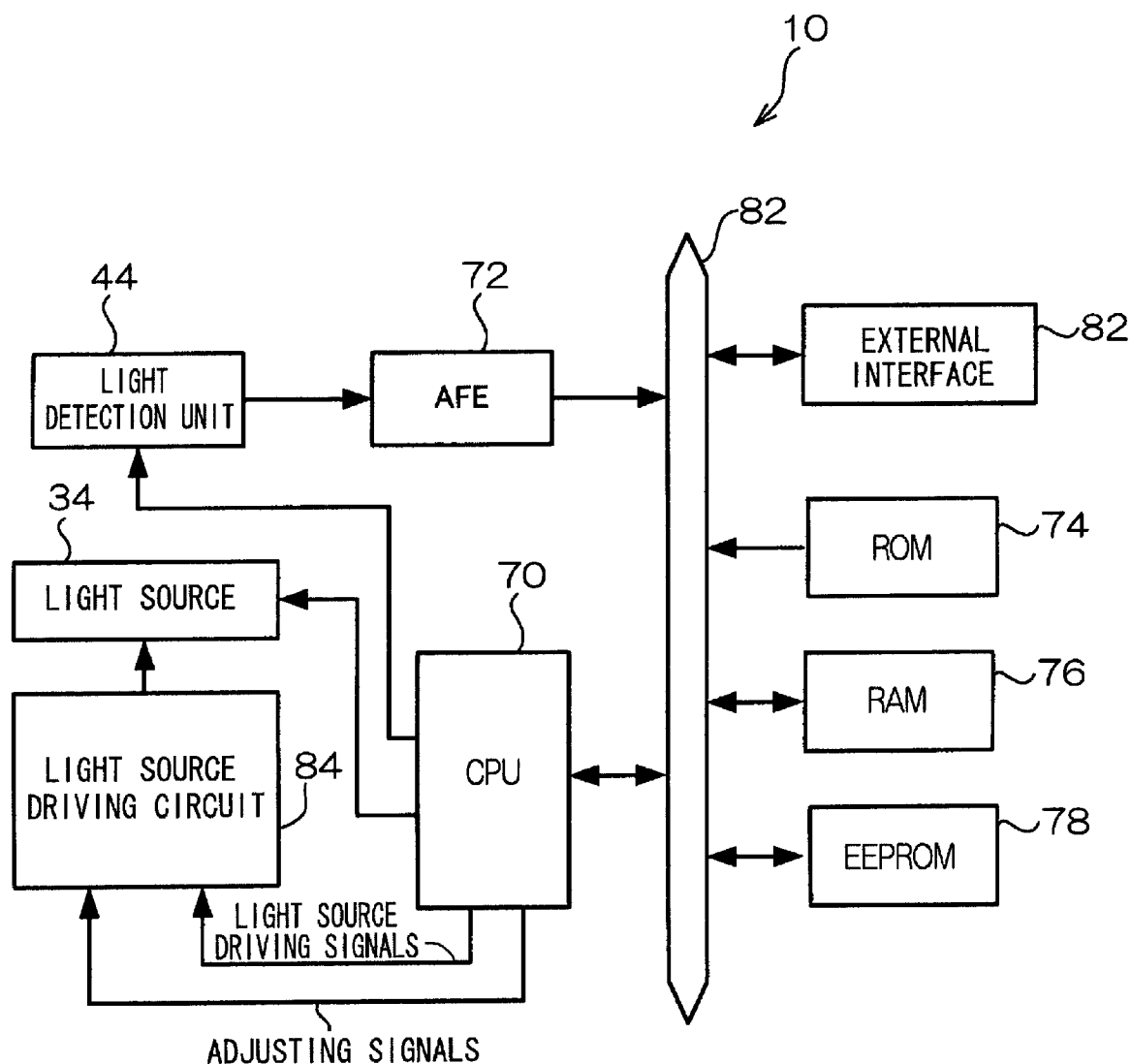
FIG. 3 is a block diagram showing the structure of main portions of an electrical system of the image reading device relating to the exemplary embodiment.

As shown in FIG. 3, the image reading device 10 has a CPU (Central Processing Unit) 70 that governs the overall operations of the image reading device 10, an AFE (Analog Front End) 72, a ROM (Read Only Memory) 74, a Ram (Random Access Memory 76), an EEPROM (Electrically Erasable and Programmable Read Only Memory) 78, and an external interface 80. The AFE 72 carries out predetermined analog signal processing on the image signals outputted from the light detection unit 44, and thereafter, carries out analog/digital conversion and converts the analog image signals to digital image information. The ROM 74 stores in advance various types of programs, various types of parameters, various types of table information, and the like. The RAM 76 is used as a work area and the like at times when various types of programs are executed by the CPU 70, and stores the digital image information. The EEPROM 78 stores and can hold various types of data, and is a non-volatile memory at which data can be rewritten. The external interface 80 is connected to an external device such as a printer, a personal computer (called "PC" hereinafter), or the like, and carries out transmitting of the digital image information to the external device, and the transmission and receipt of various types of information to and from the external device.

The CPU 70, the AFE 72, the ROM 74, the RAM 76, the EEPROM 78 and the external interface 80 are electrically connected to one another via a system bus 82. Accordingly, the CPU 70 can carry out control of the operations of the AFE 72, access to the ROM 74, the RAM 76 and the EEPROM 78, transmission and receipt of various types of information to and from the external device via the external interface 80, and the like.

The image reading device 10 also has a light source driving circuit 84 for driving the light source 34.

The light source driving circuit 84 is connected to the CPU 70. Light source driving signals, that are for controlling the on and off of the emission of illumination light by the light-emitting elements 35, and adjusting signals, that are for adjusting the light amounts of the illumination light, are inputted to the light source driving circuit 84 from the CPU 70. The light source driving circuit 84 drives the light source 34 on the basis of these light source driving signals and adjusting signals.

The light detection unit 44 and the light source 34 also are connected to the CPU 70. The CPU 70 controls the operations of the light detection unit 44, and controls the presence/absence of the supply of electric power to the light-emitting elements 35 provided at the light source 34.

The structure of main portions of the light source driving circuit 84 relating to the present exemplary embodiment is shown in FIG. 4.

The light source driving circuit 84 has, per light-emitting element 35, a switch 90 that switches the on and off of the emitting of illumination light of the light-emitting element 35 in accordance with the light source driving signal inputted from the CPU 70, and a variable resistor 92 that adjusts the light amount of the illumination light emitted from the light-emitting element 35.

Note that, in the light source driving circuit 84 relating to the present exemplary embodiment, NPN transistors are used as the switches 90, but the present invention is not limited to the same. Other switches that can be electrically connected and disconnected such as, for example, field effect transistors, relay switches, or the like, may be used.

The light source driving circuit 84 relating to the present exemplary embodiment is equipped with the variable resistors 92 for the respective light-emitting elements 35, and a variable resistor controller 94 that adjusts the resistance values of the respective variable resistors 92 on the basis of the adjusting signals inputted from the CPU 70.

The light source 34 has an electric power supplying section 96. Electric power is supplied from the electric power supplying section 96 to the respective light-emitting elements 35.

Note that, on the basis of the light amounts detected by the light detection unit 44, the image reading device 10 relating to the present exemplary embodiment derives a difference amount between a reference value and an average value of light amounts of a predetermined number (first number) of the light-emitting elements 35 that are adjacent (adjacent to one another), for each group of the first predetermined number of the light-emitting elements 35. On the basis of the derived difference amount, the image reading device 10 carries out light amount adjusting processing that adjusts the light amounts of the illumination light of the predetermined number of adjacent light-emitting elements 35, so that the average value becomes the reference value.

Further, in the light amount adjusting processing relating to the present exemplary embodiment, a deviation amount between a reference value and the average value of the light amounts per the predetermined number of adjacent light-emitting elements 35, is used as the difference amount, and the resistance values of the variable resistors 92 are adjusted in order to adjust the light amounts of the illumination light of the respective light-emitting elements 35. To this end, the image reading device 10 relating to the present exemplary embodiment stores, in the ROM 74 and in correspondence with the deviation amounts, adjustment amounts of the resistance values of the variable resistors 92 for making the average value be the reference value. In the light amount adjusting processing, the adjustment amounts corresponding to the derived deviation amounts are read-out from the ROM 74, and the light amounts are adjusted by adjusting the resistance values of the variable resistors 92 per group by using the read-out adjustment amounts. Namely, the adjusting signals, that are outputted from the CPU 70 and are inputted to the variable resistor controller 94, express the adjustment amounts of the respective variable resistors 92.

The light amount adjusting processing will be described next with reference to FIG. 5A and FIG. 5B.

The image reading device 10 relating to the present exemplary embodiment executes the light amount adjusting processing separately in two stages that are a rough adjustment processing and a fine adjustment processing.

Figure 5A:
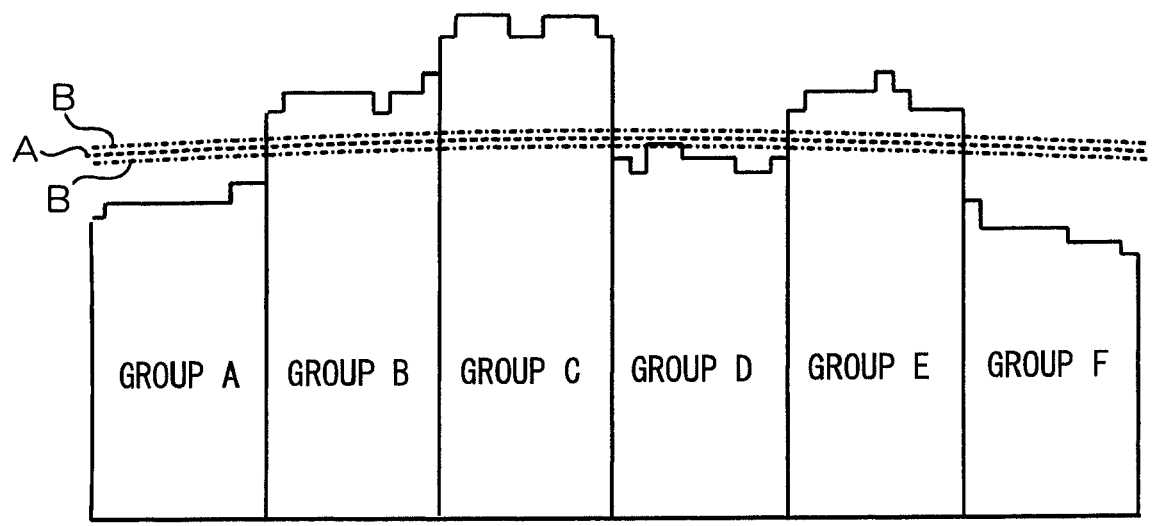
FIG. 5A and FIG. 5B are drawings provided for explanation of light amount adjusting processing relating to the exemplary embodiment.
Figure 5B:
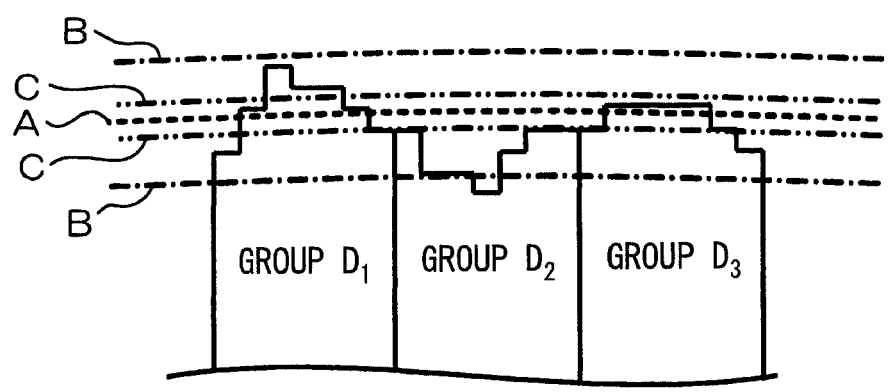

Note that the arrayed positions of the light-emitting elements 35 are shown on the horizontal axes in the graphs of FIG. 5A and FIG. 5B, and the intensities of the light amounts detected at the light detection unit 44 are shown on the vertical axes.

Note that, in the light amount adjusting processing relating to the present exemplary embodiment, six is used as an example of the number of the predetermined number of adjacent light-emitting elements 35. Therefore, because the image reading device 10 relating to the present exemplary embodiment is equipped with 36 of the light-emitting elements 35 as described above, the light-emitting elements 35 are divided into 6 groups (hereinafter called "rough adjustment groups") A through F.

As shown in FIG. 5A, in the rough adjustment processing, a deviation amount between a reference value (chain line A in FIG. 5A) and the average value of the light amounts of the rough adjustment group, is derived for each rough adjustment group.

Then, in a case in which the magnitude of the derived deviation amount is not included within a fine adjustment range (the range shown by the one-dot chain lines B in FIG. 5A), the resistance values of the variable resistors 92 are adjusted per rough adjustment group by using an adjustment amount that is set at a first interval that corresponds to deviation amounts whose magnitudes are magnitudes that are outside of the fine adjustment range.

On the other hand, the fine adjustment processing is executed in cases in which the magnitude of the derived deviation amount is included within the fine adjustment range.

In the fine adjustment processing, as shown in FIG. 5B, the light-emitting elements 35 of a predetermined number (second number) obtained by dividing the rough adjustment group into plural subdivisions are made into respective groups (called "fine adjustment groups" hereinafter). By using a subdivision average value that averages the light amounts of the fine adjustment group, a subdivision deviation amount, that is a difference amount between the subdivision average value and a reference value, is derived for each of the fine adjustment groups.

Note that, in the fine adjustment processing relating to the present exemplary embodiment, two is used as an example of the number of the light-emitting elements 35 that form a fine adjustment group. Namely, in the fine adjustment processing relating to the present exemplary embodiment, because each rough adjustment group is six of the light-emitting elements 35, in FIG. 5A for example, the rough adjustment group D, at which the magnitude of the deviation amount is within the fine adjustment range, is subdivided and grouped into three fine adjustment groups $D_1, D_2, D_3$. Note that, in the following explanation, in order to differentiate between the respective fine adjustment groups, each fine adjustment group is denoted by a number 1 through 3 added as a subscript to the letter of the rough adjustment group of origin such as above.

In the fine adjustment processing relating to the present exemplary embodiment, the resistance values of the variable resistors 92 are adjusted per fine adjustment group by using an adjustment amount that is set at a second interval, that is more narrow than the first interval and that corresponds to subdivision deviation amounts whose magnitudes are magnitudes within the fine adjustment range.

Note that, in the image reading device 10 relating to the present exemplary embodiment, the adjustment amounts corresponding to the respective deviation amounts are stored in the ROM 74 as rough adjustment amount information, and the adjustment amounts corresponding to the respective subdivision deviation amounts are stored in the ROM 74 as fine adjustment amount information.

Note that, in the light amount adjusting processing relating to the present exemplary embodiment, in a case in which the subdivision average value of a fine adjustment group is within a reference range that includes a reference value (the range shown by the two-dot chain lines C in FIG. 5B), it is considered that the light amount has become the reference value, and the fine adjustment processing for that fine adjustment group ends.

The adjustment amounts of the resistance values of the variable resistors 92 that are stored in the ROM 74 will be described next with reference to FIG. 6A and FIG. 6B. Note that FIG. 6A is a schematic drawing showing an example of rough adjustment amount information, and FIG. 6B is a schematic drawing showing an example of fine adjustment amount information. Note that, in the image reading device 10 relating to the present exemplary embodiment, "5" is used as an example of the first interval, and "1" is used as an example of the second interval.

As shown in FIG. 6A and FIG. 6B, cases in which the sign of the adjustment amount is "− (negative)" show that the resistance value of the variable resistor 92 is made lower. In these cases, the amount of current provided to the light-emitting element 35 becomes lower, and as a result, the light amount of the illumination light that the light-emitting element 35 emits is adjusted to as to become lower.

Cases in which the sign of the adjustment amount is "+ (positive)" show that the resistance value of the variable resistor 92 is made larger. In these cases, the amount of current provided to the light-emitting element 35 becomes greater, and, as a result, the light amount of the illumination light that the light-emitting element 35 emits is adjusted so as to become greater.

If a deviation amount that matches the derived deviation amount is not included in the rough adjustment amount information, the adjustment amount, that corresponds to the deviation amount expressed by the rough adjustment amount information that is nearest to the derived deviation amount, is read-out. Further, also if a deviation amount that matches the derived subdivision deviation amount is not included in the fine adjustment amount information, the adjustment amount, that corresponds to the deviation amount expressed by the fine adjustment amount information that is nearest to the derived subdivision deviation amount, is read-out.

The image reading device 10 relating to the present exemplary embodiment stores the resistance values of the respective variable resistors 92 after having been adjusted by the light amount adjusting processing, as set resistance value information in the EEPROM 78.

Figure 7A:
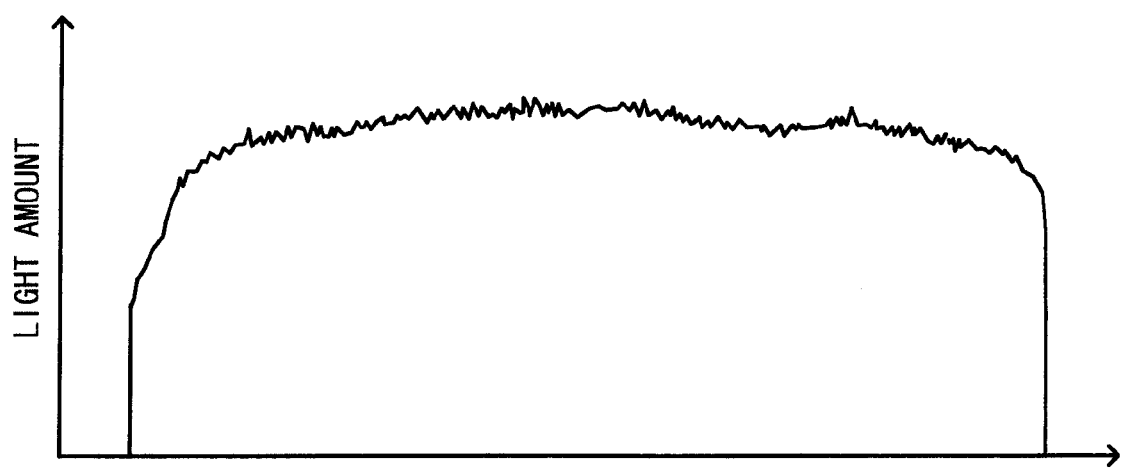
FIG. 7A and FIG. 7B are drawings showing examples of the magnitudes of light amounts before and after execution of the light amount adjusting processing relating to the exemplary embodiment.
Figure 7B:
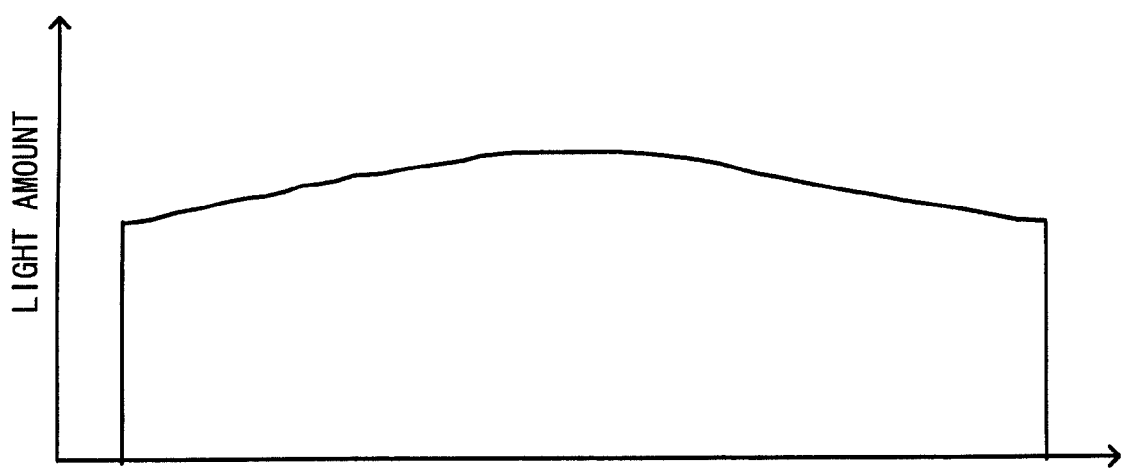

FIG. 7A and FIG. 7B show examples of actually measured values of light amounts of illumination light that are reflected by the reference plate 46 and detected at the light detection unit 44, before and after the light amount adjusting processing is executed. Note that, in the graphs shown in FIG. 7A and FIG. 7B, the arrayed position of the light-emitting element 35 is shown on the horizontal axes, and the intensity of the light amount detected at the light detection unit 44 is shown on the vertical axes.

Note that, at the light detection unit 44, the closer to the outer peripheral portions of the light-receiving surface, the more the received light amount decreases due to lens aberration. Therefore, a shape that shows ideal light amounts detected at the light detection unit 44 is a shape in which the intensity in a vicinity of the center of the arrayed positions of the light-emitting elements 35 is high and the intensity gradually becomes lower toward the end portions. Note that, in the light amount adjusting processing relating to the present exemplary embodiment, as an example, the reference value is set such that the intensity in a vicinity of the center of the arrayed positions of the light-emitting elements 35 is high and the intensity gradually becomes lower toward the end portions, so that the shape that shows the light amounts after adjustment becomes the ideal shape.

The graph shown in FIG. 7A shows the light amounts detected at the light detection unit 44 before the light amount adjusting processing is executed. Although the light amounts shown in the graph of FIG. 7A gradually become lower toward the end portions, differences in the light amounts arise locally, and this is not an ideal image signal.

On the other hand, the graph shown in FIG. 7B shows the light amounts detected at the light detection unit before the light amount adjusting processing is executed. Among the light amounts shown in the graph of FIG. 7B, the light amount in the vicinity of the center is high, and the light amounts gradually decrease toward the end portions. It can be understood that the light amounts of the illumination light that the light-emitting elements 35 emit are corrected by the light amount adjusting processing.

Figure 8:
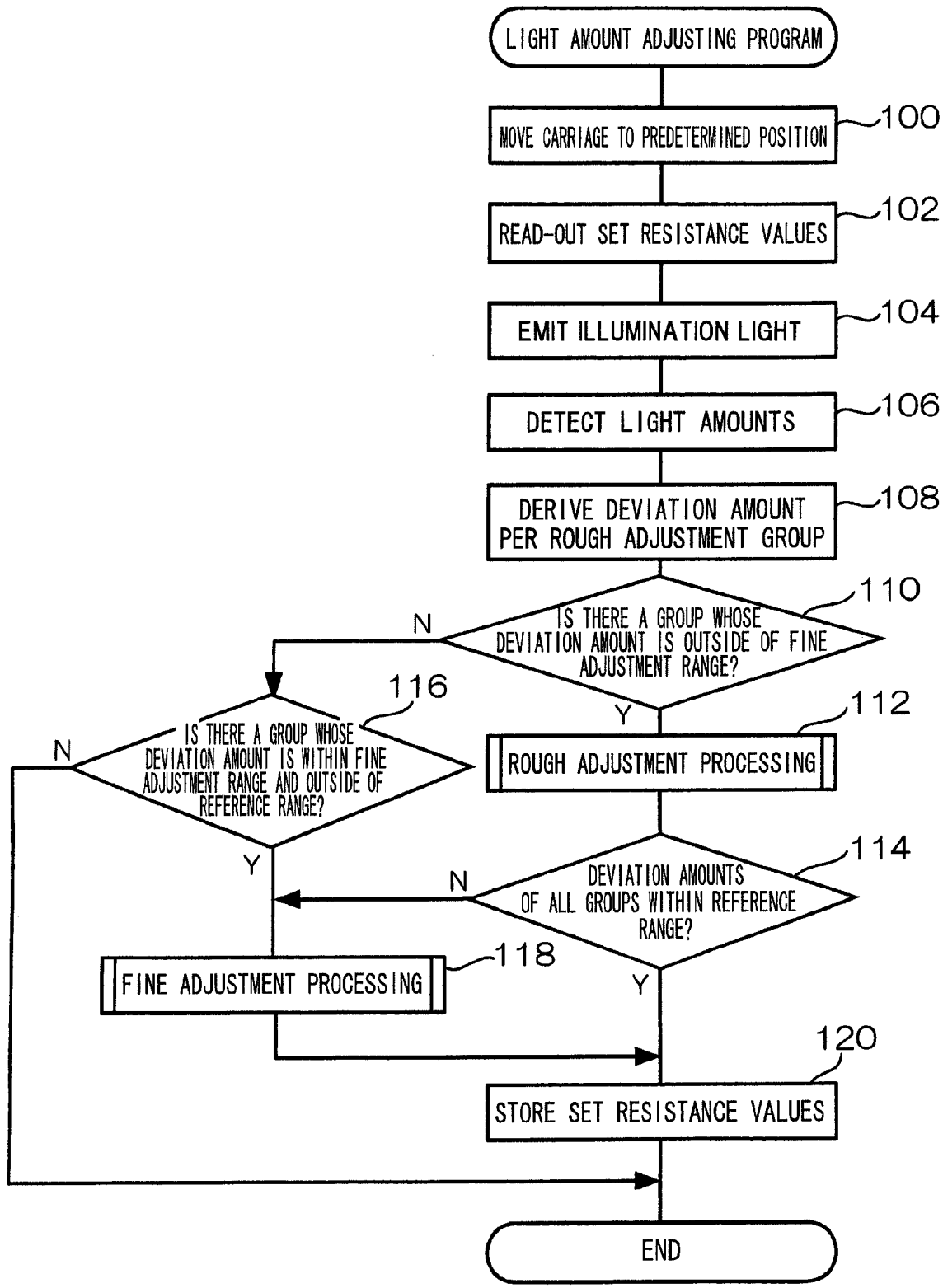
FIG. 8 is a flowchart showing the flow of the light amount adjusting processing relating to the exemplary embodiment.

Next, operation of the image reading device 10 relating to the present exemplary embodiment will be described with reference to FIG. 8. Note that FIG. 8 is a flowchart showing the flow of the processing of a light amount adjusting program that is executed by the CPU 70 in a case in which an instruction to execute light amount adjusting processing is given by a user. This program is stored in advance in a predetermined region of the ROM 74. Note that the instruction to carry out the light amount adjusting processing is inputted via an unillustrated operation panel or a PC that is connected to the external interface 80.

First, in step 100, the carriage to which the light source 34 and the like are fixed is moved to beneath the reference plate 46 that is the predetermined position.

In next step 102, the set resistance value information that is stored in the EEPROM 78 is read-out, adjusting signals that are based on the resistance values expressed by the read-out set resistance value information are transmitted to the variable resistor controller 94, and the resistance values of the variable resistors 92 are adjusted per rough adjustment group.

In subsequent step 104, light source driving signals are outputted to the switches 90, and the illumination light emitted from the respective light-emitting elements 35.

In next step 106, the light detection unit 44 detects the light amounts of the illumination light reflected by the reference plate 46.

In subsequent step 108, on the basis of the light amounts detected by the processing of step 106, deviation amounts are derived between the reference value and the average values of the light amounts of each of the rough adjustment groups.

In next step 110, it is judged whether or not there exists a rough adjustment group at which the magnitude of the deviation amount is outside of the fine adjustment range. If this judgment is affirmative, the routine moves on to step 112.

In step 112, rough adjustment processing is executed.

In next step 114, it is judged whether or not the deviation amounts of all of the rough adjustment groups are within the reference range. If this judgment is affirmative, the routine moves onto step 120, whereas if this judgment is negative, the routine moves on to step 118.

In step 116, it is judged whether or not there exists a rough adjustment group at which the magnitude of the deviation amount is within the fine adjustment range and outside of the reference range. If this judgment is affirmative, the routine moves on to step 118. If the judgment is negative, the magnitudes of the deviation amounts of all of the rough adjustment groups are within the reference range, and therefore, the present program ends.

In step 118, fine adjustment processing is executed.

In step 120, the resistance values of the variable resistors 92 after adjustment by the rough adjustment processing and the fine adjustment processing are stored in the EEPROM 78 as set resistance value information, and the present program ends.

Figure 9:
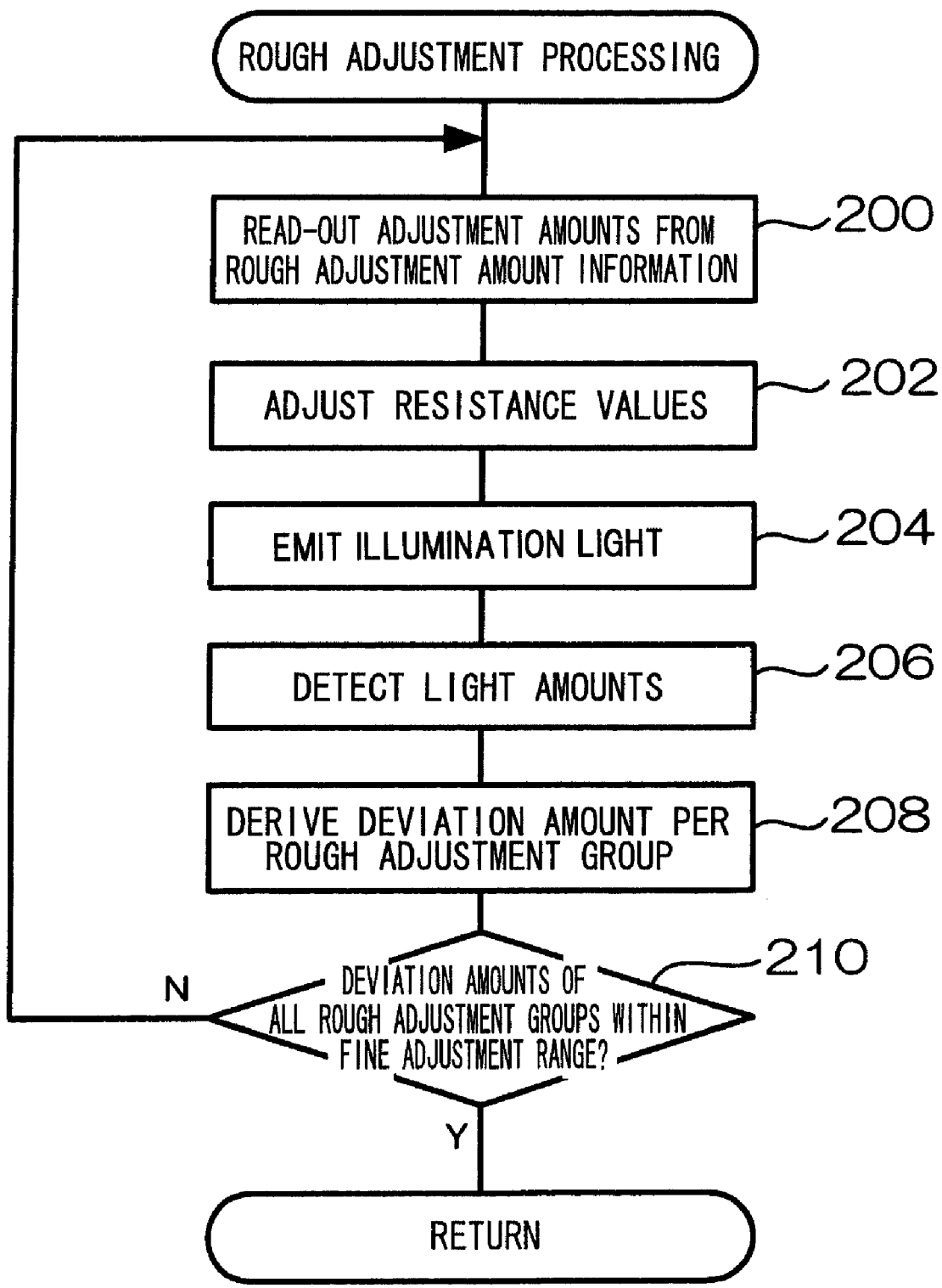
FIG. 9 is a flowchart showing the flow of rough adjustment processing relating to the exemplary embodiment.

Next, the rough adjustment processing will be described with reference to FIG. 9.

First, in step 200, for each rough adjustment group, the adjustment amount of the variable resistors 92 that corresponds to the deviation amount derived by the processing of step 108, is read-out from the rough adjustment amount information stored in the ROM 74.

In next step 202, adjusting signals, that express the adjustment amounts read-out in the processing of step 200, are transmitted to the variable resistor controller 94, and the resistance values of the variable resistors 92 are adjusted per rough adjustment group.

In subsequent step 204, light source driving signals are transmitted to the switches 90, and the illumination light is emitted from the respective light-emitting elements 35.

In next step 206, the light amounts of the illumination light reflected by the reference plate 46 are detected at the light detection unit 44.

In next step 208, on the basis of the light amounts detected by the processing of step 206, a deviation amount between the reference value and the average value of the light amounts is derived for each rough adjustment group.

In subsequent step 210, it is judged whether or not the magnitudes of the deviation amounts of all of the rough adjustment groups are within the fine adjustment range. If this judgment is negative, the routine moves on to step 200, and the processings of steps 200 through 206 are repeated for the rough adjustment groups at which the magnitude of the deviation amount is not within the fine adjustment range. On the other hand, if the judgment is affirmative, the present processing ends, and the routine returns to the light amount adjusting processing.

Figure 10:
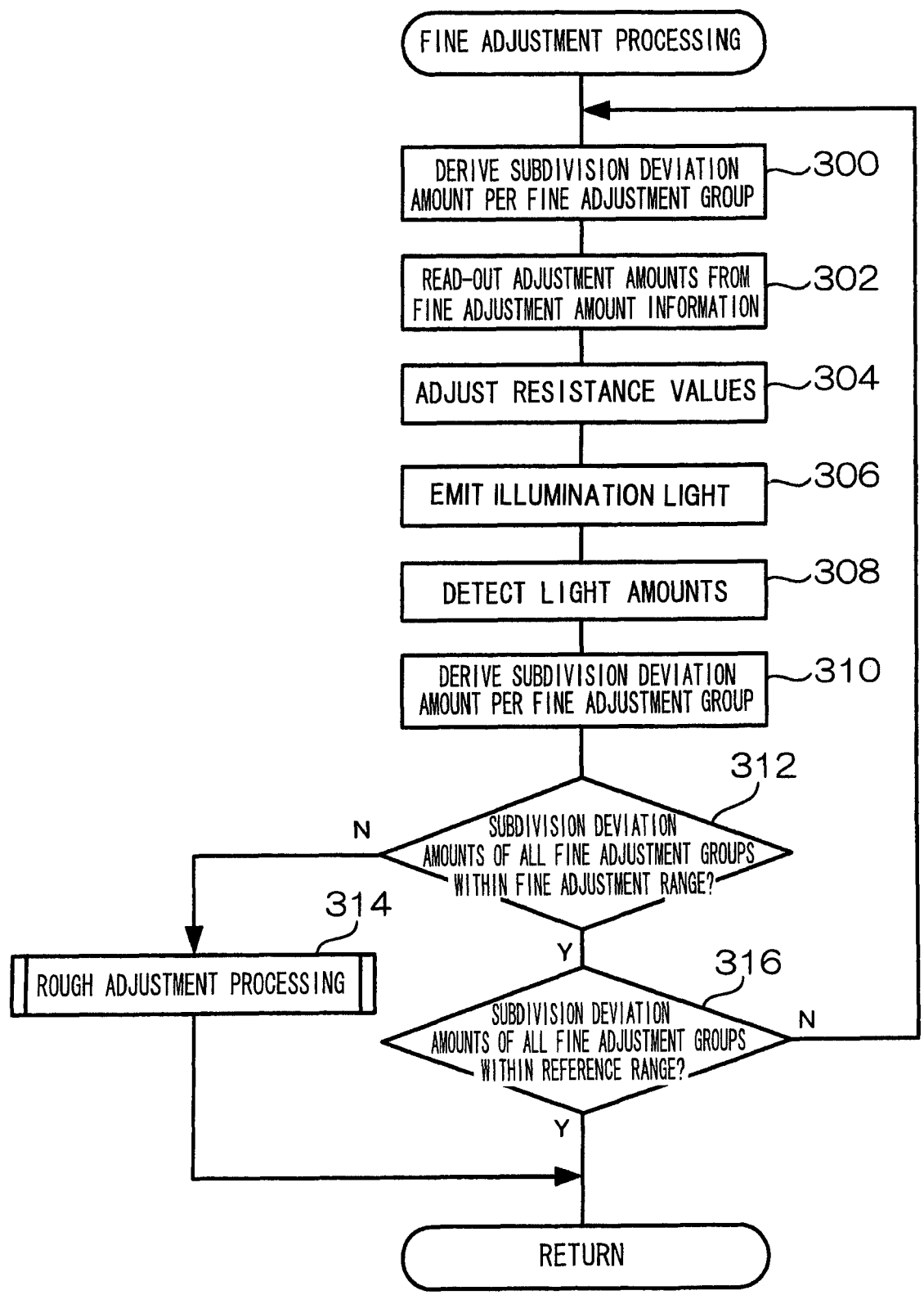
FIG. 10 is a flowchart showing the flow of fine adjustment processing relating to the exemplary embodiment.

Next, the fine adjustment processing will be described with reference to FIG. 10.

First, in step 300, the subdivision deviation amount is derived per fine adjustment group on the basis of the light amounts detected by the light detection unit 44 (if moving from step 114 to the fine adjustment processing, the light amounts detected in the processing of step 206, or, if moving from step 116 to the fine adjustment processing, the light amounts detected in the processing of step 106).

In next step 302, for each fine adjustment group, the adjustment amount of the variable resistors 92 that corresponds to the subdivision deviation amount derived in the processing of step 300, is read-out from the fine adjustment amount information stored in the ROM 74.

In subsequent step 304, adjusting signals, that express the adjustment amounts read-out in the processing of step 302, are transmitted to the variable resistor controller 94, and the resistance values of the variable resistors 92 are adjusted per fine adjustment group.

In next step 306, light source driving signals are transmitted to the switches 90, and illumination light is emitted from the light source 34.

In next step 308, the light amounts of the illumination light reflected by the reference plate 46 are detected by the light detection unit 44.

In subsequent step 310, the subdivision deviation amount is derived per fine adjustment group, on the basis of the light amounts detected by the processing of step 308.

In next step 312, it is judged whether or not the magnitudes of the subdivision deviation amounts of all of the fine adjustment groups are within the fine adjustment range. If this judgment is negative, the routine moves on to step 314 and rough adjustment processing is executed. If the judgment is affirmative, the routine proceeds to step 316.

In step 316, it is judged whether or not the subdivision deviation amounts of all of the fine adjustment groups are within the reference range. If this judgment is negative, the routine returns to step 300. If the judgment is affirmative, the present processing ends, and the routine returns to the light amount adjusting processing.

Although the present invention has been described by using the above exemplary embodiment, the technical scope of the present invention is not limited to the scope described in the above exemplary embodiment. Various modifications or improvements may be added to the above exemplary embodiment within a scope that does not deviate from the gist of the present invention, and forms that include such modifications or improvements also are included within the technical scope of the present invention.

Further, the above-described exemplary embodiment does not limit the present invention relating to the claims, and all of the combinations of features described in the exemplary embodiment are not essential. The present invention in various stages is included in the above-described exemplary embodiment, and a variety of inventions can be extracted from combinations of the plural features that are disclosed. Even if several of the features are omitted from all of the features that are shown in the above exemplary embodiment, structures from which several features are omitted can be extracted as the present invention provided that the effects of the present invention are obtained thereby.

Figure 11:
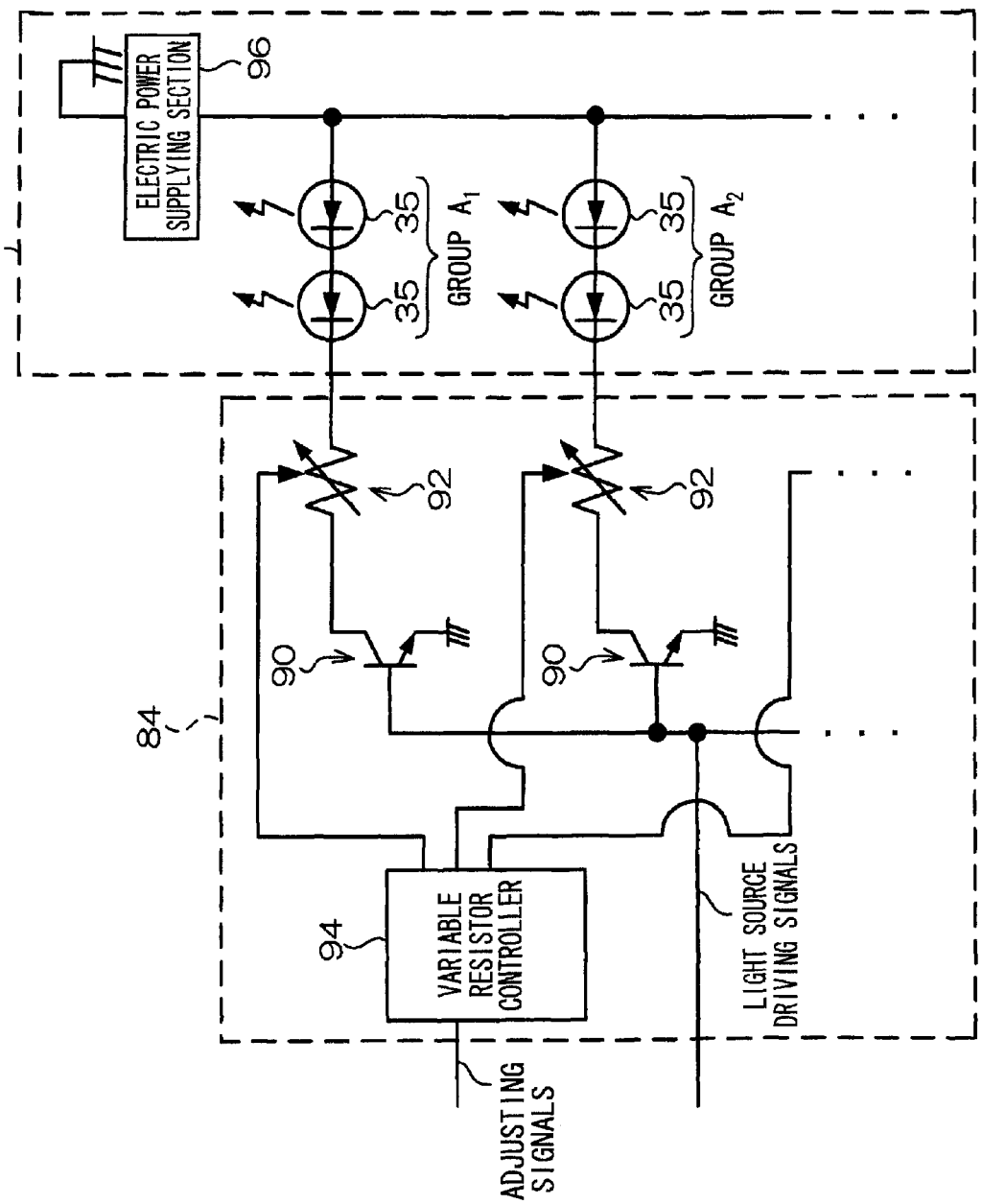
FIG. 11 is a circuit diagram showing a modified example of the light source driving circuit.

For example, the above exemplary embodiment describes a case in which the variable resistor 92 is provided for each of the light-emitting elements 35. However, the present invention is not limited to the same. As shown in FIG. 11, there may be a form in which the variable resistor 92 is provided per light-emitting elements 35 that structure a fine adjustment group.

Further, the above exemplary embodiment describes a case in which, as the light amount adjusting processing, the resistance values of the variable resistors 92 are adjusted. However, the present invention is not limited to the same. The light amount adjusting processing may be of a form that adjusts the magnitudes of the voltages that are applied to the light-emitting elements 35. In this case, the electric power supplying section 96 is provided per light-emitting element 35 or per fine adjustment group, and, on the basis of control signals from the CPU 70, the magnitudes of the applied voltages of the respective electric power supplying sections 96 are adjusted per light-emitting element 35 or per fine adjustment group.

Further, the above exemplary embodiment describes a case of using, as the difference amount, the deviation amount between the reference value and the average value of the light amounts per group, but the present invention is not limited to the same. There may be a form in which the ratio of the average value to a reference value is utilized as the difference amount. In this case, the image reading device 10 adjusts the light amounts per rough adjustment group or per fine adjustment group such that the ratio of the reference value and the average value becomes one-to-one. Further, adjustment amounts corresponding to the ratios are stored in the ROM 74.

A case is described in the above exemplary embodiment in which the light amount adjusting processing is executed when an instruction to execute the light amount adjusting processing is given by a user. However, the present invention is not limited to the same. The light amount adjusting processing may be executed at the time of adjustment when shipping-out the image reading device 10, or each predetermined interval of the accumulated working time of the image reading device 10, or each time a predetermined number of the documents 18 are read in continuation, or each time the light source 34 is replaced, or the like.

Further, although the exemplary embodiment describes a case in which the light-emitting elements 35 emit the illumination light toward the reference plate 46 and the obverse of the document 18, the present invention is not limited to the same. There may be a form in which a reflecting plate is provided at the light source 34, and the light-emitting elements 35 emit illumination light toward the reflecting plate, and the illumination light reflected at the reflecting plate is illuminated onto the reference plate 46 and the document 18.

Still further, although a case is described in which the image reading device 10 relating to the present exemplary embodiment stores the rough adjustment amount information and the fine adjustment amount information in the ROM 74, the present invention is not limited to the same. The rough adjustment amount information and the fine adjustment amount information may be stored in the storage device of a PC that is connected to the external interface 80.

In addition, the structure of the image reading device 10 described in the exemplary embodiment (see FIG. 1 through FIG. 4, and FIG. 11) is an example. Unnecessary portions may be course be omitted, and new portions may of course be added, within a scope that does not deviate from the gist of the present invention.

The flow of the processing of the light amount adjusting program described in the exemplary embodiment (see FIG. 8 through FIG. 10) also is an example. Of course, unnecessary steps may be omitted, new steps may be added, and the order of processings may be rearranged, within a scope that does not deviate from the gist of the present invention. For example, the above exemplary embodiment describes a case in which the fine adjustment processing is executed in a case in which, in the rough adjustment processing, the magnitudes of the deviation amounts of all of the rough adjustment groups are within the fine adjustment range. However, the present invention is not limited to the same. There may be a form in which the rough adjustment processing and the fine adjustment processing are executed in parallel, such that even if, in the rough adjustment processing, the magnitudes of the deviation amounts of all of the rough adjustment groups are not within the fine adjustment range, the fine adjustment processing is executed with respect to the rough adjustment groups at which the magnitudes of the deviation amounts are within the fine adjustment range.

The light amount adjusting program described in the exemplary embodiment may be stored in a computer readable medium and the program may cause a computer to execute a process for light amount adjustment in an image reading device. The embodiments discussed above may be stored in a computer readable storage medium having a computer-executable program embedded thereon, the program including computer executable instructions, and when executed by a computer, the program may cause the computer to implement the various embodiments disclosed above.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. An image reading device comprising:
a light source comprising a plurality of light-emitting elements that are arrayed along a predetermined direction, the plurality of light-emitting elements emitting illumination light and being grouped into a plurality of groups, each group having a predetermined first number of adjacent light-emitting elements;
a detection unit that detects light amounts of illumination light, the illumination light being emitted from the plurality of light-emitting elements and reflected by a reference plate positioned on an opposite side of a platen glass from the light-emitting elements;
a derivation unit that derives difference amounts for each group of light-emitting elements between a pre-defined reference value and an average value of light amounts detected by the detection unit for the group;
an adjusting unit that, on the basis of the difference amounts derived by the derivation unit, adjusts light amounts per group of light-emitting elements such that the average value becomes the reference value; and
a memory that stores, in correspondence with the difference amounts, adjustment amounts for making the average values be the reference value,
wherein the adjusting unit reads out from the memory the adjustment amounts that correspond to the difference amounts derived by the derivation unit, and adjusts the light amounts per group of light-emitting elements by using the read-out adjustment amounts,
wherein the memory stores first adjustment amounts that are set at a first interval that corresponds to difference amounts of magnitudes outside of a predetermined range and second adjustment amounts that are set at a second interval that is narrower than the first interval and that corresponds to difference amounts of magnitudes within the predetermined range, and wherein
in a case in which magnitudes of the difference amounts are within the predetermined range, the derivation unit derives subdivision difference amounts that are difference amounts between subdivision average values and the reference value by using, as the average values, the subdivision average values that average light amounts per predetermined second number of adjacent light-emitting elements obtained by dividing each of the groups of light-emitting elements into a plurality of subdivisions, and
the adjustment unit reads out from the memory the second adjustment amounts that correspond to the subdivision difference amounts derived at the derivation unit, and adjusts the light amounts per subdivision by using the read-out second adjustment amounts.

2. An image reading device comprising:
a light source at which a plurality of light-emitting elements are arrayed along a predetermined direction, the plurality of light-emitting elements emitting illumination light and being grouped into a plurality of groups, each group having a predetermined first number of adjacent light-emitting elements, and light-emitting elements of each group being divided into a plurality of subdivisions;
a detection unit that detects light amounts of illumination light, the illumination light being emitted from the plurality of light-emitting elements and reflected by a reference plate positioned on an opposite side of a platen glass from the light-emitting elements;
a derivation unit that, on the basis of the light amounts detected by the detection unit, derives difference amounts for each group of light-emitting elements expressing differences between a pre-defined reference value and an average value of light amounts detected by the detection unit of the group, and in a case in which magnitudes of the difference amounts are within a predetermined range, derives subdivision difference amounts expressing differences between the pre-defined reference value and a subdivision average value that average light amounts per subdivision of the group; and
an adjustment unit that, on the basis of the difference amounts derived by the derivation unit, in a case in which magnitudes of the difference amounts are outside of the predetermined range, adjusts light amounts per group of light-emitting elements such that the average value become the reference value, on the basis of first adjustment amounts that are set at a first interval corresponding to the difference amounts, and, in a case in which magnitudes of the difference amounts are within the predetermined range, adjusts light amounts per subdivision of the group such that the subdivision average value becomes the reference value, on the basis of second adjustment amounts that are set at a second interval that is narrower than the first interval and that corresponds to the subdivision difference amounts.

3. The image reading device of claim 2, wherein variable resistors are respectively connected to the plurality of light-emitting elements, and the first adjustment amounts and the second adjustment amounts are resistance values of the variable resistors.

4. The image reading device of claim 2, wherein a variable resistor is respectively connected to the each subdivision of the group of light-emitting elements, and the first adjustment amounts and the second adjustment amounts are resistance values of the variable resistors.

5. A computer readable medium storing a program causing a computer to execute a process for light amount adjustment in an image reading device having a light source including a plurality of light-emitting elements that emit illumination light, are arrayed along a predetermined direction and are grouped into a plurality of groups, each group having a pre-determined first number of adjacent light- emitting elements, and a detection unit detecting light amounts of the illumination light emitted from the plurality of light-emitting elements and are reflected by a reference plate positioned on an opposite side of a platen glass from the light-emitting elements, the process comprising:

on the basis of the light amounts detected by the detection unit, deriving difference amounts between a pre-defined reference value and an average value of light amounts detected by the detection unit per group of adjacent light-emitting elements;

on the basis of the derived difference amounts, adjusting light amounts per group of light-emitting elements such that the average value becomes the reference value; and storing adjustment amounts for making the average values be the reference value, in a memory in correspondence with the difference amounts, wherein the adjusting further comprises reading-out from the memory the adjustment amounts that correspond to the derived difference amounts, and adjusting the light amounts per group of light-emitting elements by using the read-out adjustment amounts, the storing further comprises storing in the memory first adjustment amounts that are set at a first interval that corresponds to difference amounts of magnitudes outside of a predetermined range, and second adjustment amounts that are set at a second interval that is narrower than the first interval and that corresponds to difference amounts of magnitudes within the predetermined range, the deriving further comprises, in a case in which magnitudes of the difference amounts are within the predetermined range, deriving subdivision difference amounts that are difference amounts between a subdivision average value and the reference value by using, as the average values, the subdivision average values that average light amounts per predetermined second number of adjacent light-emitting elements obtained by dividing each of the groups of light-emitting elements into a plurality of subdivisions, and the adjusting further comprises reading-out from the memory the second adjustment amounts that correspond to the derived subdivision difference amounts, and adjusting the light amounts per the second number of light-emitting elements by using the read-out second adjustment amounts.

6. A computer readable medium storing a program causing a computer to execute a process for light amount adjustment in an image reading device having a light source including a plurality of light-emitting elements that emit illumination light, are arrayed along a predetermined direction and are grouped into a plurality of groups, each group having a pre-determined first number of adjacent light- emitting elements, and a detection unit detecting light amounts of the illumination light emitted from the plurality of light-emitting elements and are reflected by a reference plate positioned on an opposite side of a platen glass from the light-emitting elements, the process comprising:

on the basis of the light amounts detected by the detection unit, deriving difference amounts between a pre-defined reference value and an average value of light amounts detected by the detection unit per group of adjacent light-emitting elements; and on the basis of the derived difference amounts, adjusting light amounts per group of light-emitting elements such that the average value becomes the reference value, wherein the deriving further comprises, on the basis of the detected light amounts, deriving difference amounts expressing differences between the reference value and the average value of light amounts per group of light-emitting elements, and in a case in which magnitudes of the difference amounts are within a predetermined range, deriving subdivision difference amounts expressing differences between the reference value and a subdivision average value that is an average of light amounts per predetermined second number of adjacent light-emitting elements obtained by dividing the group of light-emitting elements into a plurality of subdivisions, and the adjusting further comprises, on the basis of the derived difference amounts, in a case in which magnitudes of the difference amounts are outside of the predetermined range, adjusting light amounts per group of light-emitting elements such that the average value becomes the reference value, on the basis of first adjustment amounts that are set at a first interval corresponding to the difference amounts, and, in a case in which magnitudes of the difference amounts are within the predetermined range, adjusting light amounts per subdivision of the group of light-emitting elements such that the subdivision average value becomes the reference value, on the basis of second adjustment amounts that are set at a second interval that is narrower than the first interval and that corresponds to the subdivision difference amounts.

* * * * *